July 30, 1963    L. A. OLSON    3,099,073
METHOD OF MAKING ANTI-FRICTION BEARING ASSEMBLY
Filed Oct. 2, 1961    3 Sheets-Sheet 1
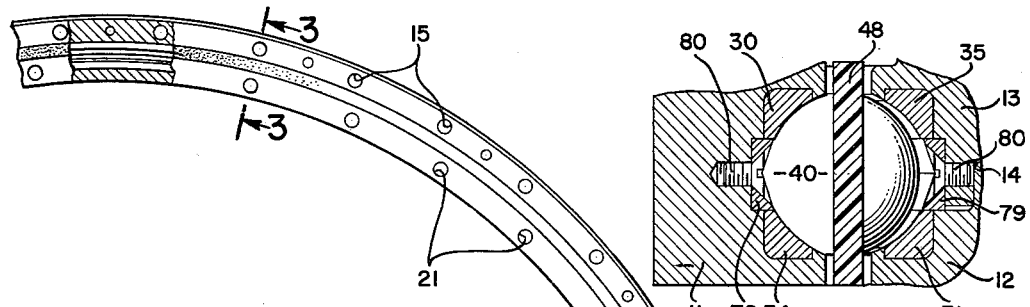
FIG. 4.
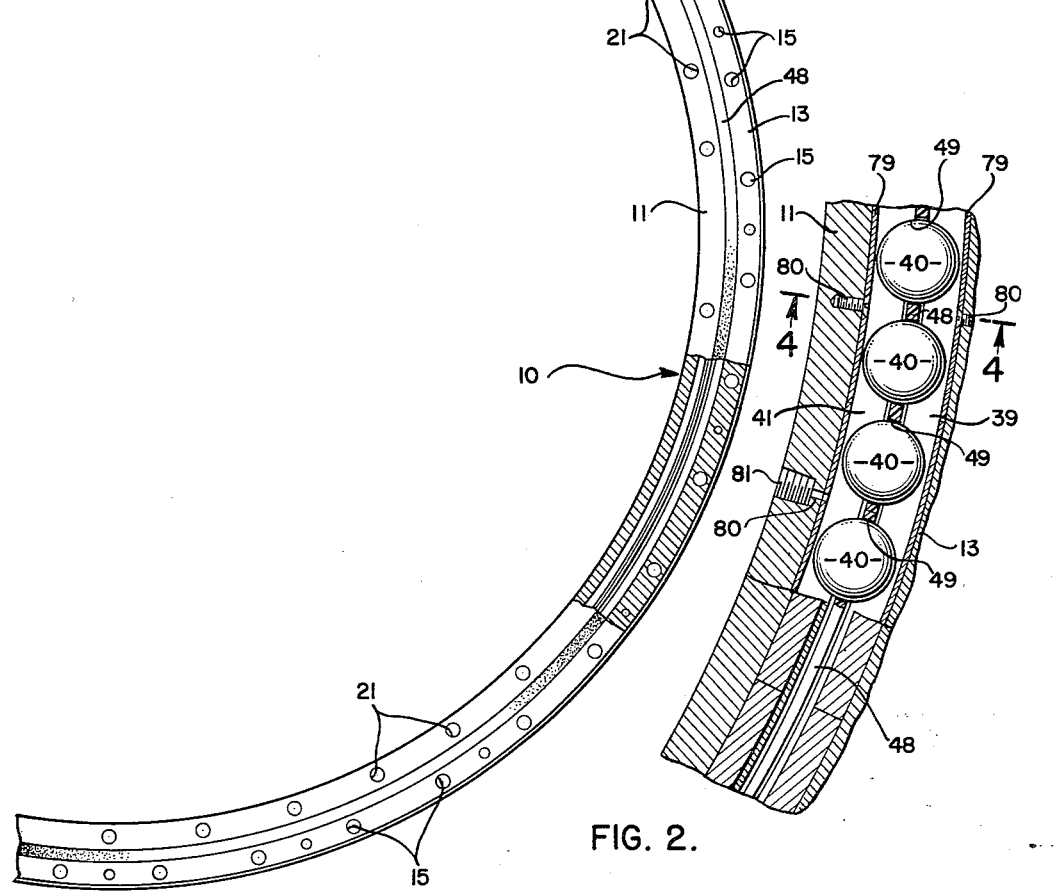
FIG. 2.
FIG. 1.
INVENTOR.
LESTER A. OLSON
BY
ATTORNEY July 30, 1963 L. A. OLSON 3,099,073
METHOD OF MAKING ANTI-FRICTION BEARING ASSEMBLY
Filed Oct. 2, 1961 3 Sheets-Sheet 2

INVENTOR.
LESTER A. OLSON
BY
ATTORNEY

July 30, 1963 L. A. OLSON 3,099,073
METHOD OF MAKING ANTI-FRICTION BEARING ASSEMBLY
Filed Oct. 2, 1961 3 Sheets-Sheet 3
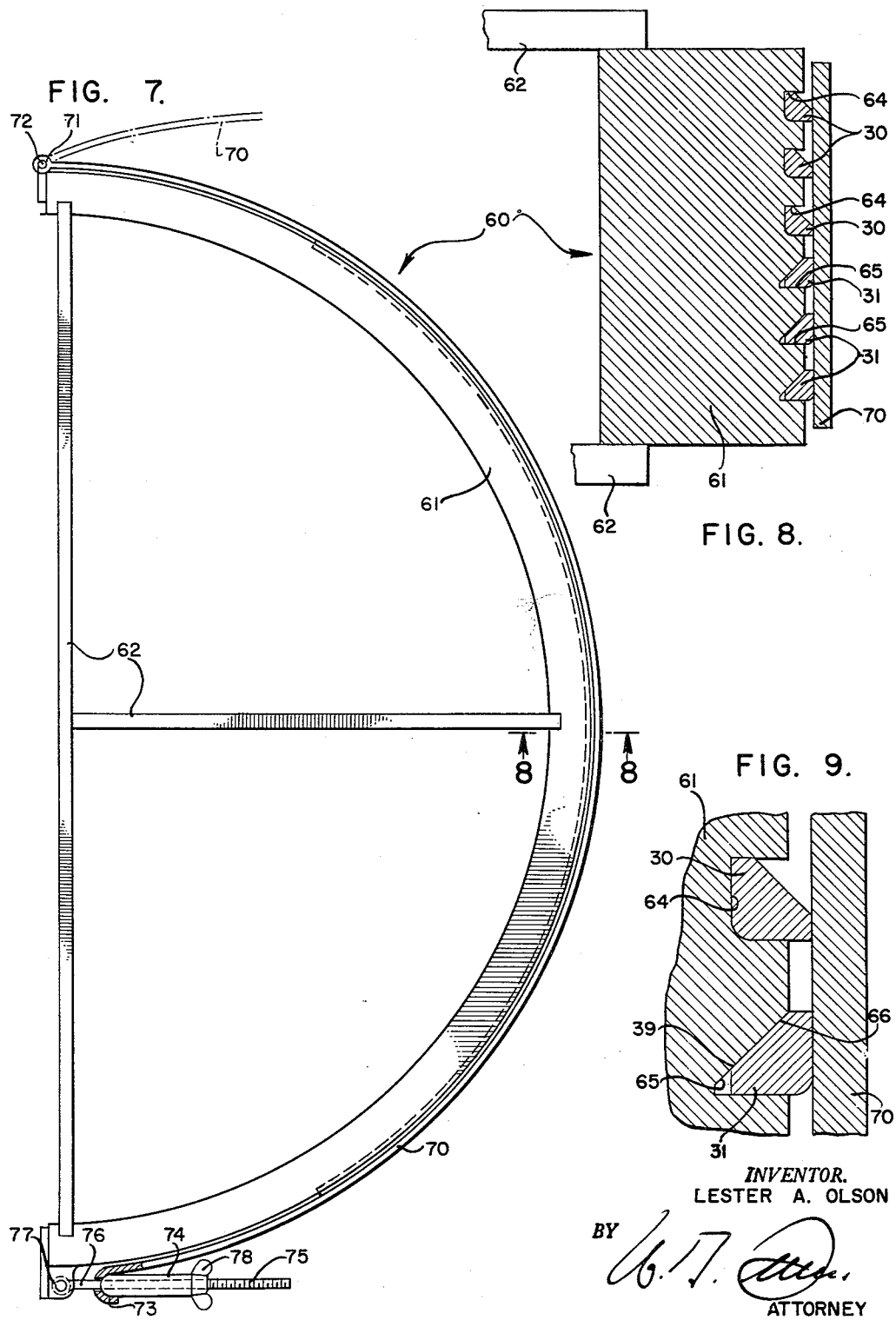
INVENTOR.
LESTER A. OLSON
BY
ATTORNEY United States Patent Office 3,099,073
Patented July 30, 1963

3,099,073
METHOD OF MAKING ANTI-FRICTION
BEARING ASSEMBLY
Lester A. Olson, Los Angeles, Calif., assignor to Keystone Engineering Company, Los Angeles, Calif., a partnership
Filed Oct. 2, 1961, Ser. No. 142,273
7 Claims. (Cl. 29—148.4)

This invention relates to anti-friction bearing assemblies and more particularly to an assembly of this type having a high strength-weight ratio gained through use of a composite body construction utilizing high-strength, lightweight material laminated to raceway insert elements of small cross-section capable of withstanding the high impact loads imposed by the anti-friction elements. The invention also features utilization of these composite principles in the construction of a combination thrust and radially loaded assembly as well as an improved low-cost method of fabricating such an assembly.

The ever present problem of increasing utility, flexibility and versatility of anti-friction bearing assemblies coupled with maximum strength, minimum weight and space requirements pose difficult problems, the attempted solution of which led to the present invention. There are many applications wherein the foregoing and similar related requirements are a prime requisite. A typical operating environment selected to provide a better understanding of the requirements and the degree to which the present invention satisfies these is that of a high-strength, ruggedduty bearing assembly to support a gun turret on the hull of a military tank. As will be readily appreciated, both the size and variety of loads imposed on a bearing assembly designed for this application are multi-fold and especially rigorous. Not only are the encountered shock and vibration loads of high magnitude, but even the more normal thrust, radial and moment loads are large and subject to instantaneous change. Additionally, the large diameter bearing structure required in this application presents special problems.

Since weight reduction is a current primary objective, it is important to find some mode of using lightweight metals without sacrificing ruggedness, durability, service life and other highly desirable characteristics. Attempts to develop lightweight alloys capable of standing up under concentrated impact loads unavoidably applied by anti-friction elements in contact therewith have been proposed but the results have been altogether unsatisfactory and unacceptable. It has also been proposed to overcome this limitation to the use of lightweight metals by employing an insert of high-strength metal. While seemingly promising, these suggestions have not been successful heretofore owing to the many problems encountered in handling and processing inserts of this type wherein the cross-sectional area of the insert is extremely small in comparison with its diameter. Furthermore, the prior attempts to use such rings have presented serious heat treating problems owing to serious distortions accompanying heat treating. There has also been no satisfactory way of holding such inserts assembled to the main body members of the assembly.

The foregoing and numerous other serious shortcomings and disadvantages of prior proposals for the construction of ball bearing assemblies having a high strength-weight ratio are overcome in a most satisfactory manner by the use of the techniques, principles and structural features constituting the present invention. Thus the several laminated ring members cooperating to provide the present bearing assembly each comprise a composite structure of two principal metals, the main body member of the ring being of a lightweight, high-strength alloy having intimately secured to a channel formed therein a relatively small raceway ring means of ferrous metal selected for its suitability for long service life and capable of being precisely heat treated. In the larger diameter sizes of the bearing assembly, such insert raceway rings are desirably formed in separate sections arranged end-to-end within complementally-shaped channels formed in the lightweight main body portions of the assembly. These high-strength, high-precision raceway inserts are preferably held permanently anchored within the receiving channels by suitable high-strength bonding agents insoluble in fluids normally encountered in the operating environment. The holding effectiveness of the bonding agent may be supplemented, if desired, by mechanical means although in practice the bonding agent is found entirely adequate without such supplements.

Among the important features of the invention is the improved method developed for processing and fabricating the composite main components of the bearing assembly. Owing to the small cross-sectional size of the insert members relative to their lengths, this invention has shown that it is quite feasible to finish and size the insert members accurately from nonheat treated straight bar stock following which the insert members are heated to a temperature at which they are readily formed into arcuate shape without risk of damage to the precision surfaces and in which arcuate shape the inserts are rigidly held while being heat hardened by techniques suitable for the particular metal employed therein. After being air or liquid quenched, as appropriate for the constituent metal, the inserts are trimmed accurately to length and so that they will just fit the truly circular receiving channel formed in the lightweight main body member. Thereafter the insert raceway rings are bonded to the main supporting rings following which the composite rings are assembled to one another along with intervening anti-friction members.

Accordingly, it is a primary object of the present invention to provide an improved method of making a composite ring assembly for use in anti-fraction bearings utilizing an outer main body ring of non-ferrous metal and a raceway insert ring structure of appreciably greater specific gravity rigidly and permanently anchored to a seating channel formed in the lightweight metal.

Another object of the invention is the provision of an anti-friction bearing assembly having a high strength-weight ratio as well as a method of fabricating the same featuring raceway inserts fabricated in sections and thereafter assembled to form a continuous lightweight supporting ring structure.

Another object of the invention is the provision of an improved method of fabricating an anti-friction bearing assembly designed for rugged duty capable of withstanding radial, thrust and moment loads and featuring the use of rolling anti-friction elements held captive between one or more pairs of concentrically related raceway rings which rings are held assembled to supporting rings primarily by a high-strength bonding agent.

Another object of the invention is the provision of an improved method of processing straight bar stock of suitable raceway bearing material which method includes the steps of heating accurately finished straight stock, quickly forming the heated stock to arcurate shape and then immediately subjecting the same while heated to air or liquid quenching to heat-harden the same.

These and other more specific objects will appear upon reading the following specification and claims and upon considering in connection therewith the attached drawings to which they relate.

Referring now to the drawings in which a preferred embodiment of the invention is illustrated.

FIGURE 1 is a top plan view taken along line 1—1 on FIGURE 3 showing a portion of an anti-friction bearing assembly incorporating the present invention with portions broken away to show details of the internal structure;

FIGURE 2 is an enlarged fragmentary view of FIGURE 1;

FIGURE 4 is a fragmentary cross-sectional view on an enlarged scale taken along line 4—4 on FIGURE 2;

FIGURE 7 is a side elevational view of the mold press used in shaping and heat-hardening the bearing insert members;

FIGURE 8 is a cross-sectional view on an enlarged scale taken along line 8—8 on FIGURE 7; and FIGURE 9 is an enlarged fragmentary sectional view showing a pair of mold cavities as shaped to receive, respectively, inner and outer ones of the bearing insert members.

Figure 3:
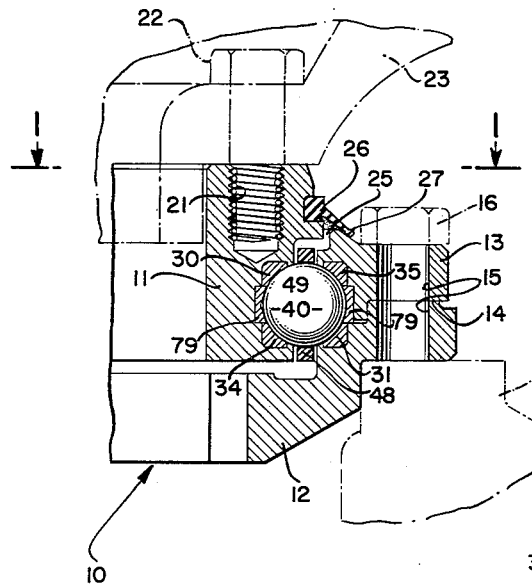
FIGURE 3 is a transverse sectional view on an enlarged scale through the bearing assembly taken along line 3—3 on FIGURE 1 and showing, in addition, by dot-and-dash phantom lines, the manner in which this assembly is mounted between the hull and the turret of a military tank.

Referring now more particularly to FIGURES 1 to 6, there is shown an illustrative embodiment of the invention designated generally 10, and including three main body rings 11, 12 and 13. It is pointed out that inner ring 11 is conveniently known as the turret ring, ring 12 as the base ring and ring 13 as the clamping ring, for reasons which will become apparent as the description proceeds. Note that rings 12 and 13 mate along a generally radial plane 14.

In the illustrated application of bearing assembly 10, the radial flanges projecting outwardly from rings 12 and 13 are provided with aligned axial holes 15 to receive cap screw 16. Screws 16 seat in threaded wells formed along rim 18 of a large diameter, horizontally disposed opening into the armored hull 19 of a military tank vehicle. Likewise, inner body ring 11 of assembly 10 is formed with a large number of upwardly opening threaded bores 21 seating cap screws 22 effective to hold the turret structure 23 of the tank to the bearing assembly. In accordance with customary practice, turret 23 is formed of armor plate and mounts one or more high power guns capable of being laid and fired in any azimuth about the vertical axis of the turret. The radial gap 25 between the juxtaposed facing rims of rings 11, 12 and 13 is protected against the entrance of fluid and foreign material by a flexible rubber sealing member 26 fixed within a channel of ring 11 and having its free edge 27 bearing resiliently against the surface of clamping ring 13.

It is pointed out that the opening into the central top portion of tank hull 19 is relatively large ranging from 6 to 8 or more feet in diameter. This fact taken with the weight of turret 23 and the auxiliaries normally carried thereby necessarily requires that bearing assembly 10 be capable of withstanding very high normal loads as well as much higher abnormal loads imposed under operating conditions and by the firing of the guns and the like. At the same time, it is manadatory to keep the overall weight of the vehicle to an asbolute minimum for many reasons including economy operation, flexibility, speed and maneuverability of the tank.

These objectives are served to a highly satisfactory degree in the construction of this invention by the use of a high-strength, lightweight, non-ferrous aluminum alloy for body rings 11, 12 and 13. Since such materials are incapable of withstanding high load concentrations imposed at the point of contact with anti-friction elements, the present invention provides raceway inserts of suitable high-strength material and preferably ferrous material.

Figure 5:
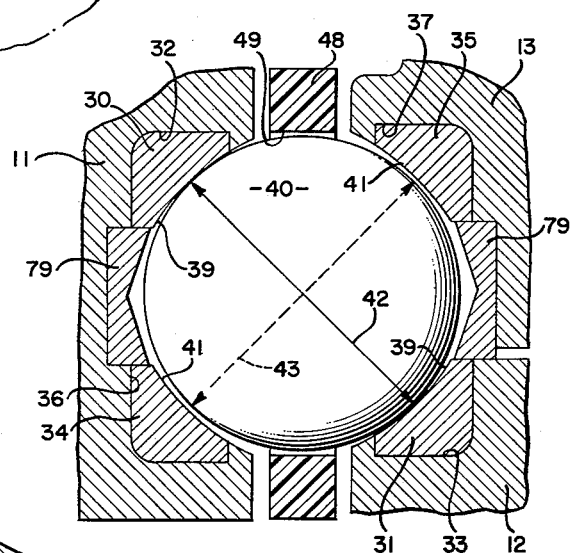
FIGURE 5 is a fragmentary sectional view on a still larger scale showing the relationship of the parts during normal thrust loading of the assembly.

Since the bearing structure here shown is subjected to thrust, radial and moment loading as well as to combinations of these, two pairs of raceway rings are employed. The pair functioning to carry the thrust load imposed by the turret are designated 30 and 31 and are located diagonally opposite one another, as is best illustrated in FIGURE 5. Raceway insert 30 is seated in a generally triangular-shaped channel 32 forming part of an outwardly opening groove in ring 11 whereas insert 31 is firmly seated in a similarly shaped seating groove 33 formed in an inwardly opening groove of ring 12. A second substantially identical pair of raceway rings 34, 35 are similarly mounted in seating channels 36 and 37, respectively, of inner ring 11 and outer ring 13. The outwardly facing surface 39 of each of the inserts is finished to high precision and smoothness with a spherical surface having a radius somewhat greater than the radius of anti-friction balls 40 to be used therewith.

A further detail of considerable importance is the fact that inserts 30 and 31 are so located and dimensioned as to be in direct thrust load supporting contact with the balls along the inclined diameter 42 shown in FIGURE 5. Under such pure thrust loading conditions, spherical surfaces 41, 41 of the other pair of inserts 34 and 35 are spaced apart sufficiently to be out of rolling contact with balls 40. Under these conditions, the spacing between the balls and raceway surfaces 41 opposite the ends of the dotted diagonal diameter 43 is about five mils. It will be appreciated that, owing to the size and weight of the structure supported by bearing assembly 10, pure thrust or radial loading seldom occurs. For this reason, it is somewhat misleading to suggest that FIGURE 5 illustrates normal conditions. This is particularly true when it is realized that owing to the large diameter of the bearing assembly and the very high loads imposed, some distortion of the assembly arising from unbalanced load conditions is almost always present. Under moment loading conditions, the body rings are likely to distort sufficiently to bring surfaces 41 of inserts 34 and 35 into contact with balls 40 at points opposite the ends of diameter 43.

Figure 6:
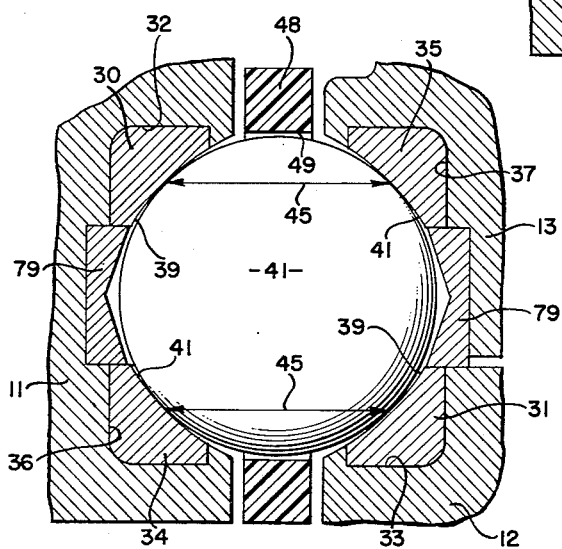
FIGURE 6 is a view similar to FIGURE 5 but showing the relationship of the parts under radial loading.

If a radial load is placed on the assembly, as occurs upon the firing of a gun carried by turret 23, then the loads imposed between balls 40 and the raceway inserts take place horizontally crosswise of the balls 40 and in the manner indicated by the parallel double-ended arrows 45, 45 in FIGURE 6. In this connection, it is pointed out that the recoil of the gun shifts the turret laterally parallel to the axis of the gun thereby distorting the rings of bearing assembly 10 into a slightly elliptical condition. In consequence, the balls 40 in diametrically opposed quadrants of the assembly will be loaded in the manner illustrated by double-ended arrows 45, 45 in FIGURE 6. At the same time, the balls in the quadrants between the first-mentioned quadrants may be partially relieved of load except for thrust and unbalanced moment loads.

As is customary in connection with bearings of the type under discussion, anti-friction elements proper 40 are held in circumferentially spaced relation between the raceway surfaces by suitable cage rings or spacer strips such as the nylon strips 48. These arcuate strips are of short length arranged end-to-end circumferentially of the assembly and each is provided with large openings 49 of which there is one for each ball 40. These openings being slightly larger in diameter than balls 40 operate substantially out of contact with the balls and serve to hold the balls out of rubbing contact with one another and substantially uniformly spaced circumferentially of the assembly.

As has been pointed out above, the small cross-section of the raceway insert members relative to their lengths is such that special procedures and techniques are advantageously employed in processing and assembling them into body rings 11, 12 and 13. Straight bar stock of carefully selected high-strength tool steel or other suitable raceway material is first subjected to high-precision machining by customary metal working methods to shape the stock into the desired cross-sectional configuration such as that shown in FIGURES 5 and 6. The rear or seating surfaces of the bars are shaped to conform exactly with and to be complemental to the mating surfaces of seating channels 32, 33, 36 and 37 of the main body rings. Spherical surfaces 39 or 41 of the raceway inserts are prepared with special care and are preferably honed substantially to a mirror finish. It is pointed out and emphasized that the cross-sectional shape of the raceway inserts is uniform throughout the length of these straight members.

The number of inserts required to form a single raceway ring varies depending upon the size of the assembly. In the size here shown, it has been found most practical to employ three inserts assembled end-to-end within a single one of the receiving channels of the main body ring. In smaller diameter assemblies, a lesser number, or even one split insert ring, is quite feasible. In larger assemblies a greater number of inserts would be employed in end-to-end relation.

Referring now to FIGURES 7 to 9, there is shown a simple and convenient forming tool designated generally 60 and found useful in the arcuate shaping and heat-treating of the inserts. Mold 60 comprises a thick-walled rigid mold member 61 suitably rigidly supported in semicircular form by connecting and reinforcing members 62.

The outwardly facing surface of mold member 61 is provided with circumferentially extending cavities 64, 65. Cavities 64 are shaped to seat raceway inserts 30 and 34 having outwardly facing raceway surfaces whereas mold cavities 65 are shaped to seat inserts 31 and 35 having inwardly facing raceway surfaces. It is important that surfaces 66 of mold cavities 65 conform to the spherical shape 39 of inserts 31, thereby avoiding any possibility of deformation of the precision surfaces 39 during the arcuate shaping of these inserts in mold 60.

Provision for applying shaping pressure to the raceway inserts while being arcuately shaped in mold 60 comprises a wide tension band 70 one end 71 of which is pivotally connected by hinge pin 72 to the lower end of mold member 61 in the manner shown in FIGURE 7. The opposite end of shaping band 70 is suitably formed as indicated at 73 to seat the enlarged end of a sleeve 74 fitting loosely over the threaded stem 75 of eye-bolt 76. The eyelet end of this bolt is pivotally connected by pin 77 to one end of mold member 61. Thumb screw 78 permits the operator to loosen or tighten the shaping band 70 as desired with respect to mold member 61.

The method of processing and fabricating the described bearing assembly is as follows. The main body rings 11, 12 and 13 are machined from lightweight stock in customary manner, such machining presenting no particular problem owing to the large cross-sectional areas of these rings. The rings are also drilled and tapped in conventional manner to receive cap screws 16 and 22.

The shaping and machining of raceway insert members 30, 31, 34 and 35 has been referred to in a general way above. Much of the final finishing of the surfaces is conducted by grinding, lapping and honing techniques while these members are supported in straight form, use being made of suitable supporting jigs and holding fixtures to avoid possibility of inaccuracies due to flexing of these members.

After making a final check to assure the accuracy and uniform cross-section of the inserts, these are placed in a furnace and heated to a temperature well above the critical temperature at which heat-hardening starts during quenching. When the inserts are made of tool steel, heating to about 1800 degrees F. is requisite. After the inserts have soaked at this temperature for approximately one hour, they are removed from the furnace and placed in an appropriate one of forming channels 64 or 65 of molding device 60. This operation is carried out as speedily as possible and the tensioning and forming band 70 is firmly clamped in place by means of eye-bolt 76 and thumb nut 78. If the material of the inserts is appropriate for heat-hardening and quenching in air, the part is left in the mold and allowed to cool to room temperature following which it is removed from the mold and reheated to some such temperature as 400 degrees F. to relieve quenching and forming stresses. If, on the other hand, the insert material requires liquid quenching to produce maximum heat-hardening, then the mold and the part are submerged in quenching liquid, following which the part is removed and stress relieved in the same manner mentioned above.

The next operation is to trim the ends of the finished inserts to precise dimensions such that the requisite number of inserts will cooperate to form a true circle when assembled end-to-end within the receiving channel of the main body ring. This having been accomplished the inserts are pressed into the appropriate one of the receiving channels of the main body ring after these channels have been coated with a high-strength waterproof adhesive such as an epoxy resin or other powerful metal bonding agent various compositions of which are now commercially available. If desired, additional support is provided by securing keeper keys 79 in place between the innermost adjacent edges of the inserts. Keepers 79 may be held in place by countersunk screws 80 (FIGURE 2). Of importance is the fact that the outer faces of keepers 79 should be suitably recessed to avoid contact with bearing balls 40. In actual practice, it has been found that keepers 79 are not strictly necessary owing to the tremendous strength of available bonding agents and the fact that the raceway inserts have such true and close fitting relation to the mating surfaces of the receiving channels.

The mounting of the bearing assembly in its operating environment is accomplished by first positioning base ring 12 in position on rim 18 of tank hull 19. Meanwhile, turret ring 11 is assembled concentrically of clamping ring 13 while both are inverted. Balls 40 together with the spacer strips 48 are then positioned between the raceway insert rings 34 and 35 of inverted rings 11 and 13 whereupon this assembly is inverted to its normal position and lowered into mating relation within base ring 12. Cap screws 16 are then placed through the aligned openings 15 to clamp the assembly together against rim 18 of tank hull 19. This completes the assembly of the bearing, it remaining only to lower turret assembly 23 into position and to clamp it there by the insertion and tightening of cap screws 22.

Preferably, turret ring 11 is provided with appropriately spaced lubricating passages 80 opening into annular space 25 containing the anti-friction balls. Openings 80 are normally closed against the entrance of foreign matter by screw plugs 81 (FIGURE 2). The lubricating grease is held against escape from space 25 by the provision of a suitable flexible seal, not shown.

The described composite ring structure forming an important feature of this invention is seen to comprise a main body ring of high-strength lightweight alloy formed with one or more seating channels having intimately bonded therewithin a relatively slender raceway insert ring of high-strength ferrous material. This insert is formed in one or more lengths arranged end-to-end to form a precision annular raceway for anti-friction elements. These inserts are of insufficient cross-section to carry more than a portion of the load imposed thereon but are fully adequate to carry heavy loads when laminated to and used in combination with the strength provided by the lightweight material forming the main body portion of the composite ring.

While the particular method of making anti-friction bearing assembly herein shown and disclosed in detail is fully capable of attaining the objects and providing the advantages hereinbefore stated, it is to be understood that it is merely illustrative of the presently preferred embodiments of the invention and that no limitations are in-

I claim:

1. That improved mode of fabricating a lightweight composite race ring for use in an anti-friction bearing assembly with the components thereof free of deformation, pressure or stress imposed by the expedients employed to hold the components assembled and which comprises forming a continuous main body ring to size and shape from lightweight non-ferrous material and including an annular channel shaped to receive and snugly seat precision raceway ring means, forming a precision raceway ring means from heat treated ferrous material with a shape adapted to fit snugly within the annular channel in said continuous main body ring, and holding said raceway ring means rigidly in place therein by adhesively bonding the same within said channel between all juxtaposed surfaces with an exposed surface of said raceway ring means positioned to provide a high-precision high-load bearing surface of revolution adapted to support anti-friction bearing elements.

2. That improved mode of fabricating a composite ring for use in an anti-friction bearing assembly as defined in claim 1 characterized in that said main body ring is formed in one piece of high strength aluminum alloy and said raceway means is formed of steel alloy.

3. That improved mode of fabricating a composite ring for use in an anti-friction bearing assembly defined in claim 1 characterized in that said raceway ring means is formed in a plurality of arcuate sections arranged end-to-end within the channel formed in said main body ring and cooperating with one another to provide a high precision annular race surface.

4. That improved mode of making a composite ring for use in an anti-friction bearing assembly defined in claim 1 characterized in finishing said raceway ring means accurately to size from nonheat treated straight bar stock, thereafter heating said bar to a temperature at which the bar is readily formable, placing said heated bar in a form having a shaping channel corresponding to the raceway ring means seating channel of said main body ring, forcibly holding said bar seated in said forming channel until cool, and thereafter bonding said accurately formed bar into the receiving channel therefor in said main body ring.

5. That improved mode of making a composite ring defined in claim 4 characterized in that individual ones of said bars are formed in such length as to require a plurality thereof arranged end-to-end to form a complete raceway ring means, and wherein said individual bars are heated to a temperature above the critical temperature for hardening by quenching before being placed in said form for bending into an arcuate shape, and including the step of quenching said bars in cold heat treating liquid after clamping said bar firmly in the desired arcuate shape and before said bar has cooled below said critical temperature.

6. That improved method of making a composite raceway ring for an anti-friction bearing assembly which comprises subjecting pre-heat treated straight steel bar stock to precision size finishing including a surface shaped for direct contact with rotating anti-friction elements in the finished form of the composite ring, heating a plurality of said bars to a temperature appreciably above the critical heat-treating quenching temperature, bending said bars to precise arcuate shape while so heated, quenching said arcuate bars while rigidly held against deformation, trimming the ends of a plurality of said arcuate bars to the extent required for the same to form a true ring, and bonding said bars in an annular receiving channel therefor formed in a retainer and supporting ring and with the bearing element contact surface facing outwardly of said receiving channel.

7. That improved method of making a composite raceway ring for an anti-friction bearing assembly which comprises subjecting nonheat treated straight steel bar stock to precision size finishing including a surface shape for direct contact with rotating anti-friction elements in the finshed form of the composite ring, heating a plurality of said bars to a temperature appreciably above the critical heat-treating quenching temperature, bending the said bars to precise arcuate shape while so heated, holding said arcuate bars rigidly in precise arcuate shape while the same cool slowly to room temperature thereby heat-hardening said bars, thereafter reheating said bars to approximately 400 degrees to relieve internal stresses, and bonding a plurality of said bars in an annular receiving channel therefor formed in a retainer ring with the bearing element contact surface facing outwardly of said receiving channel.

References Cited in the file of this patent
UNITED STATES PATENTS

| | | |
|---|---|---|
| 2,297,878 | Denneen et al. | Oct. 6, 1942 |
| 2,399,847 | Bauersfeld | May 7, 1946 |
| 2,741,498 | Elliott | Apr. 10, 1956 |
| 2,741,826 | Hall | Apr. 17, 1956 |
| 2,917,351 | Franke et al. | Dec. 15, 1959 |
| 3,023,056 | Smith | Feb. 27, 1962 |